R. N. BURGEDORFF.
ATTACHMENT FOR CRANK ARMS.
APPLICATION FILED MAY 29, 1916.

1,227,743.

Patented May 29, 1917.

Witnesses
Otto E. Hoddick
Grace Huston

Inventor
R. N. Burgedorff
By A. J. O'Brien
Attorney

UNITED STATES PATENT OFFICE.

RAYMOND N. BURGEDORFF, OF DENVER, COLORADO.

ATTACHMENT FOR CRANK-ARMS.

1,227,743. Specification of Letters Patent. Patented May 29, 1917.

Application filed May 29, 1916. Serial No. 100,522.

*To all whom it may concern:*

Be it known that I, RAYMOND N. BURGEDORFF, a citizen of the United States, residing in the city and county of Denver and State of Colorado, have invented certain new and useful Improvements in Attachments for Crank-Arms; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in bicycles, and my object is to present an attachment for the same, whereby the leverage obtained through the medium of the crank arms may be increased or decreased at will by simply changing the position of the pedals. I wish it understood, however, that my attachment is not applicable to bicycles alone, since it can be employed in connection with any crank arm used in a similar capacity.

My improvement briefly stated consists in adjustably mounting a bracket upon the extremity of each crank arm and securing the pedals to the said brackets.

Figure 1:
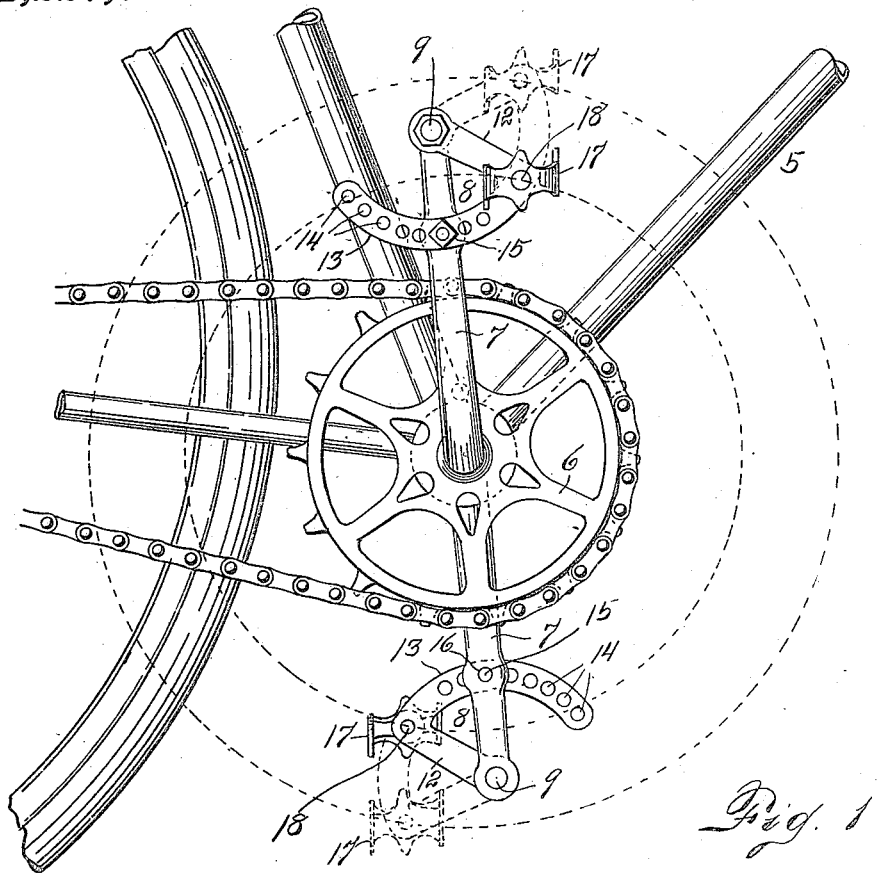

Having briefly outlined my improved construction, I will proceed to describe the same in detail, reference being made to the accompanying drawing, in which is illustrated an embodiment thereof. In this drawing, Figure 1 is a detail view of the hanger bearing of a bicycle equipped with my improvement.

Figure 2:
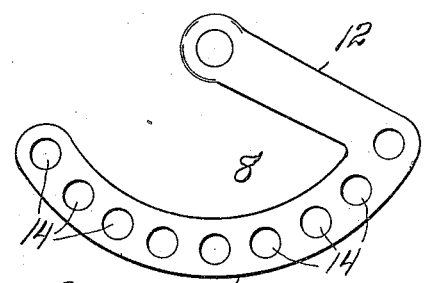

Fig. 2 is a detail view of the bracket employed.

The same reference characters indicate the same parts in both the views.

Let the numeral 5 designate the frame of a bicycle; 6 the sprocket wheel; and 7 the crank arms which are pivotally connected with the said frame, and to one of which the sprocket wheel 6 is secured. These elements are all of the usual construction.

A bracket 8 is pivotally connected as shown at 9 with the extremity of each crank arm 7, the said bracket being composed of a short arm 12 having a curved extension 13, said arm being disposed at an angle to the latter, and when the bracket is in place upon the extremities of the crank arms a line passed centrally and longitudinally through the said extension will coincide with an arc struck from the pivotal point 9 as a center.

This curved extension has a series of perforations 14 formed therein which extend throughout its length. The bracket 82 may be adjusted to the desired position and secured in this position by means of a bolt 15 which is adapted to be passed through any one of the perforations 14 and screwed into a perforation 16 formed in the crank arm 7, the wall of the perforation 16 being threaded for this purpose.

A pedal 17 is mounted upon the bracket in the usual manner as disclosed at 18, this point being where the short arm 12 merges into the extension 13 or at the angle formed by the said parts.

As disclosed by dotted lines in Fig. 1, the bracket 8 may be adjusted in such a manner that the pivot of the pedals 17 will travel around an area, the circumference of which may be greater or less than that around which the extremities of the crank arms travel. It is, of course, also true that the pedals may travel around the same area as the said crank arm extremities. Also the pedals 17 may be located forward or to the rear of the crank arms as may be desired, but it is preferable to have them located in advance of the latter.

In view of the above description it is believed that it will be readily understood that by employing my improvement the leverage obtained through the medium of the crank arms 7 may be increased or diminished as circumstances may require, by simply changing the position of the pedals.

Having thus described my invention, what I claim is,—

In combination, a crank arm and bracket pivotally connected at the outer extremity to the crank arm, said bracket comprising a relatively short arm fitting a curved quadrant extension, the curve of said extension coinciding with an arc struck from the pivotal point between the bracket and the crank arm as a center, a pedal mounted on said bracket at the junction of the short arm and extension, the extension being provided with a series of perforations, and means adapted to be inserted through said perforations and engage the crank arm at a point near the outer end of said crank arm for adjustably securing the bracket in place.

In testimony whereof I affix my signature, in presence of two witnesses.

RAYMOND N. BURGEDORFF.

Witnesses:
GRACE HUSTON,
A. EBERT O'BRIEN.

Copies of this patent may be obtained for five cents each, by addressing the "Commissioner of Patents, Washington, D. C."